United States Patent
Kitamura et al.

(10) Patent No.: US 8,184,299 B2
(45) Date of Patent: May 22, 2012

(54) REDUCE SIZE SEMICONDUCTOR RING LASER GYROSCOPE INCLUDING A SENSOR COIL MADE OF A MULTILAYER WOUND OPTICAL FIBER

(75) Inventors: Atsushi Kitamura, Nagano (JP); Miki Sugawara, Nagano (JP)

(73) Assignee: Minebea Co., Ltd., Nagano (JP)

( * ) Notice: Subject to any disclaimer, the term of this patent is extended or adjusted under 35 U.S.C. 154(b) by 405 days.

(21) Appl. No.: 12/459,923

(22) Filed: Jul. 9, 2009

(65) Prior Publication Data

US 2010/0046000 A1  Feb. 25, 2010

(30) Foreign Application Priority Data

Aug. 19, 2008  (JP) .................................. 2008-210260

(51) Int. Cl.
 *G01C 19/72* (2006.01)
(52) U.S. Cl. ....................................................... 356/465
(58) Field of Classification Search ........... 356/459–476
 See application file for complete search history.

(56) References Cited

U.S. PATENT DOCUMENTS 4,405,236 A * 9/1983 Mitsuhashi et al. .......... 356/459

FOREIGN PATENT DOCUMENTS

JP  2007-071614  3/2007

* cited by examiner

*Primary Examiner* — Hwa Lee
(74) *Attorney, Agent, or Firm* — Carrier Blackman & Associates, P.C.; Joseph P. Carrier; William D. Blackman

(57) ABSTRACT

A semiconductor ring laser gyroscope includes: a semiconductor laser for emitting two lights from both end surfaces thereof; an optical fiber ring through which the two lights propagate in the respective opposite directions, which, in association with the semiconductor laser, constitutes a laser resonator, and which includes a sensor coil made of an optical fiber wound in a multilayer manner; and an optical detection unit for detecting a rotational angular velocity based on beat frequencies of the two lights, wherein an expression: $2\Delta F_{beat\_max} < F_{rlg} \leq 10 \Delta F_{beat\_min}$ is satisfied in which $F_{rlg} = C/nL$, where $\Delta F_{beat\_max}$ and $\Delta F_{beat\_min}$ are beat frequencies corresponding respectively to the upper and lower limits of an angular velocity measuring range, $F_{rlg}$ is a ring resonance frequency, C is a light speed, n is a refractive index of the optical fiber, and L is an overall length of the optical fiber.

9 Claims, 7 Drawing Sheets

US 8,184,299 B2

REDUCE SIZE SEMICONDUCTOR RING LASER GYROSCOPE INCLUDING A SENSOR COIL MADE OF A MULTILAYER WOUND OPTICAL FIBER

BACKGROUND OF THE INVENTION

1. Field of the Invention

The present invention relates to a semiconductor ring laser gyroscope in which a rotational angular velocity of an object is detected on the basis of a beat signal which is generated due to the Sagnac effect when lights emitted from the both end surfaces of a semiconductor laser circulate through an optical fiber loop in respective opposite directions, and relates particularly to a semiconductor ring laser gyroscope suitable for downsizing.

2. Description of the Related Art

An optical fiber gyroscope which utilizes the Sagnac effect to measure a rotational angular velocity (angular velocity) of an object is widely used mainly in the aircraft and rocket industries. In a conventional optical fiber gyroscope, a light emitted from an end surface of a light source is separated by a photocoupler and introduced into an optical fiber loop so as to propagate in respective opposite directions, and an angular velocity is measured by detecting a phase fluctuation caused by the Sagnac effect between two lights circulating through the optical fiber loop in respective opposite directions.

Meanwhile, recently, an optical gyroscope is proposed in which a semiconductor laser to emit lights from both end surfaces thereof is disposed in the optical fiber loop thereby constituting a laser resonator (such a gyroscope is hereinafter referred to as a semiconductor ring laser gyroscope as appropriate) (refer to, for example, Japanese Patent Application Laid-Open No. 2007-71614).

FIG. 7 schematically shows the composition of an optical gyroscope 50 as a semiconductor ring laser gyroscope disclosed in Japanese Patent Application Laid-Open No. 2007-71614. The optical gyroscope 50 includes a semiconductor optical amplifier (SOA) 51 and an optical fiber 52 which is looped and which has its both ends connected respectively to end surfaces 51A and 51B of the semiconductor optical amplifier 51. The semiconductor optical amplifier 51 emits a clockwise laser beam CW and a counter-clockwise laser beam CCW (hereinafter referred to simply as "laser beams CW and CCW") from the end surfaces 51A and 51B, respectively, also amplifies by stimulated emission the laser beams CW and CCW which have made a circuit through the optical fiber 52 in the respective opposite directions and returned, and then emits the amplified laser beams CW and CCW into the optical fiber 52 again.

The laser beams CW and CCW propagating through the optical fiber 52 are partly extracted therefrom and introduced into an optical fiber 54 by a photocoupler 53 and then are overlapped on each other by a photocoupler 55. The laser beams CW and CCW overlapped on each other are guided to a photodetctor 57 via an optical fiber 56. The photodetector 57 performs square-law detection of the overlapped laser beams CW and CCW and detects a beat signal generated due to a difference in oscillation frequency between the laser beams CW and CCW. The difference in oscillation frequency between the laser beams CW and CCW is caused because the semiconductor optical amplifier 51 and the optical fiber 52 in combination constitute a laser resonator. That is to say, the difference results from the fact that the lengths of the clockwise and counter-clockwise laser resonators experience an effective change due to the Sagnac effect arising from the rotation of a table 60.

The beat signal detected by the photodetector 57 is sent to a spectrum analyzer 58, and a frequency (beat frequency) $f_B$ of the beat signal is detected there. An angular velocity of a rotating body (optical fiber loop) is calculated by a detection device 59 based on the following expression showing the relation between the beat frequency $f_B$ and an angular velocity $\Omega$:

$$f_B = (4A/n\lambda P)\Omega$$

where A is an area of a region enclosed by the optical fiber 52, n is a refractive index of the optical fiber 52, $\lambda$ is a wavelength of the laser beams CW and CCW, and P is a path length of the laser beams CW and CCW.

The semiconductor ring laser gyroscope as described above is adapted to detect an angular velocity according to a beat frequency and therefore is essentially capable of measuring an angular velocity with high detection sensitivity. However, the present inventors, while designing to reduce the size of an optical fiber loop for the purpose of downsizing the semiconductor ring laser gyroscope, found out that it is difficult or even impossible to detect an angular velocity when the optical fiber loop has a diameter of, for example, about 100 mm (almost a palm size).

It is supposed that the semiconductor ring laser gyroscope disclosed in Japanese Patent Application Laid-Open No. 2007-71614 achieves high detection sensitivity by incorporating as a light source a semiconductor optical amplifier (SOA) adapted to obtain a laser beam having a small spectral line width (a large Q value). The semiconductor optical amplifier, however, is expensive, and so it is proposed, in order to provide a low-cost semiconductor ring laser gyroscope, to use as a light source a semiconductor laser (Fabry-Perot semiconductor) as employed, for example, in an optical pickup of an optical disk drive, which emits a laser beam having a large spectral line width but is inexpensive.

Also, a polarization preserving fiber may be used as an optical fiber in order to improve the detection sensitivity of the semiconductor ring laser gyroscope. However, a polarization preserving fiber and a coupler using such a polarization preserving fiber are expensive. Further, the polarization preserving fiber must be coupled to the light source with a high accuracy rotation positioning.

Moreover, it is difficult to detect rotation direction in the semiconductor ring laser gyroscope using an optical fiber.

SUMMARY OF THE INVENTION

The present invention has been made in light of the problems described above, and it is a primary object of the present invention to provide a semiconductor ring laser gyroscope which is small and inexpensive and at the same time is capable of detecting an angular velocity with excellent sensitivity.

In order to the achieve the object described above, according to an aspect of the present invention, there is provided a semiconductor ring laser gyroscope including: a semiconductor laser for emitting two lights from both end surfaces thereof; an optical fiber ring through which the two lights emitted from the both end surfaces of the semiconductor laser propagate in respective opposite directions, and which, in association with the semiconductor laser, constitutes a laser resonator; an optical detection unit for detecting a rotational angular velocity based on beat frequencies of the two lights propagating through the optical fiber ring in the respective opposite directions; and a sensor coil which is made of an optical fiber wound in a multilayer manner and which constitutes a part of the optical fiber ring.

In the aspect of the present invention, the optical fiber ring may be structured to satisfy an expression: $F_{rlg} \leqq 10 \Delta F_{beat\_min}$ where $F_{rlg}$ (=C/nL) is a ring resonance frequency, $\Delta F_{beat\_min}$ (beat frequency lower limit) is a beat frequency corresponding to the lower limit $\Omega_{min}$ of an angular velocity measuring range, C is a light speed, n is a refractive index of the optical fiber, and L is an overall length of the optical fiber.

In the aspect of the present invention, the optical fiber ring may be structured to satisfy an expression: $2\Delta F_{beat\_max} < F_{rlg}$ where $F_{rlg}$ (=C/nL) is a ring resonance frequency, $\Delta F_{beat\_max}$ (beat frequency upper limit) is a beat frequency corresponding to the upper limit $\Omega_{max}$ of an angular velocity measuring range, C is a light speed, n is a refractive index of the optical fiber, and L is an overall length of the optical fiber.

In the aspect of the present invention, the optical fiber ring may be structured to satisfy an expression: $2\Delta F_{beat\_max} < F_{rlg} \leqq 10 \Delta F_{beat\_min}$, where $F_{rlg}$ (=C/nL) is a ring resonance frequency, $\Delta F_{beat\_max}$ (beat frequency upper limit) and $\Delta F_{beat\_min}$ (beat frequency lower limit) are beat frequencies corresponding respectively to the upper and limits $\Omega_{max}$ and $\Omega_{min}$ of an angular velocity measuring range, C is a light speed, n is a refractive index of the optical fiber, and L is an overall length of the optical fiber.

In the aspect of the present invention, the optical detection unit may include: an optical splitter for extracting part of each of the two lights propagating through the optical fiber ring in the respective opposite directions; a multiplexing prism for causing the two lights extracted by the optical splitter to interfere with each other; a sectioned photodiode including a plurality of light receiving faces for receiving an interfered light produced by the multiplexing prism; and a mask disposed between the multiplexing prism and the sectioned photodiode and comprising a plurality of slits having their respective phases shifted from one light receiving face to another.

According to the present invention, the two lights propagating through the optical fiber tin in the respective opposite directions are partly extracted and caused to interfere with each other thereby generating interference stripes. The interference stripes fall incident on the sectioned photodiode including a plurality of light receiving faces dependent of one another via the slits which are shifted from one light receiving face to another, where the speed and the direction of the movement of the interference stripes can be detected, and the rotation direction as well as the beat frequency (angular velocity) can be detected based on the information detected.

DETAILED DESCRIPTION OF THE INVENTION

Exemplary embodiments of the present invention will hereinafter be described with reference to the accompanying drawings.

Figure 1:
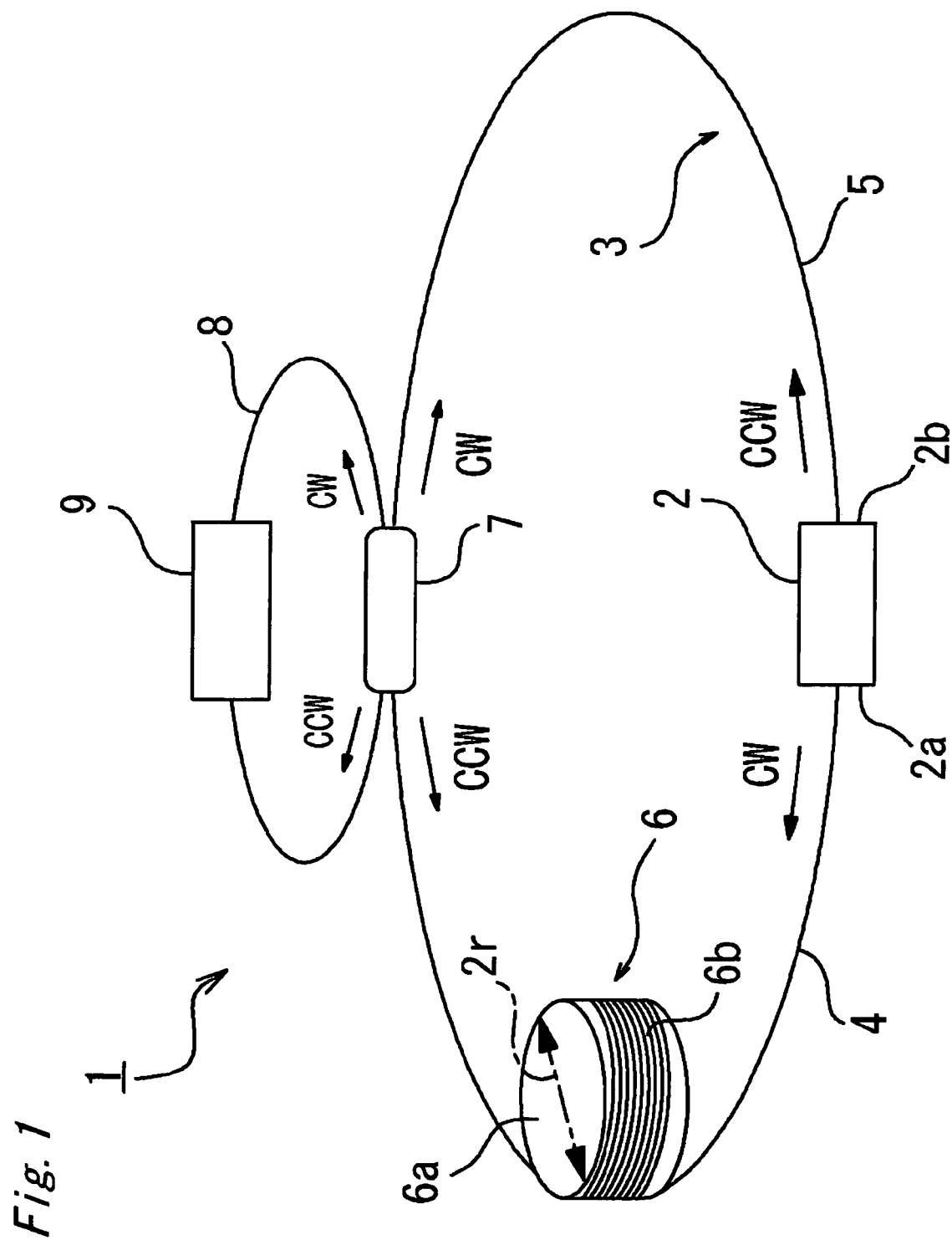
FIG. 1 is a schematic view of a semiconductor ring laser gyroscope according to a first embodiment of the present invention.

FIG. 1 schematically shows a semiconductor ring laser gyroscope 1 according to a first embodiment of the present invention. Referring to FIG. 1, the semiconductor ring laser gyroscope 1 according to the first embodiment includes a semiconductor laser 2 to emit a clockwise laser beam CW (hereinafter referred to as CW light) and a counter-clockwise laser beam CCW (hereinafter referred to as CCW light) respectively from its both end surfaces 2a and 2b, an optical fiber ring 3 through which the CW light and the CCW light emitted from the end surfaces 2a and 2b of the semiconductor laser 2 propagate in the respective opposite directions, an optical splitter 7 to extract and separate parts of the CW and CCW lights, and an optical detection unit 9 to detect an angular velocity based on a frequency (beat frequency) of a beat signal generated by the CW and CCW lights separated at the optical splitter 7.

In the present embodiment, the semiconductor laser 2 is a Fabry-Perot semiconductor laser which is made of a GaAs system material adapted to emit a light with a wavelength of 850 nm, and which emits a light having a spectral line width of about 10 MHz. The end surfaces 2a and 2b (hereinafter referred to specifically as left surface 2a and right end surface 2b, respectively, as appropriate) of the semiconductor laser 2 are coated with an antireflective film, whereby the semiconductor laser 2 is enabled to emit lights from the end surfaces 2a and 2b with a small amount of light reflected thereat.

In the present embodiment, the optical fiber ring 3 is made of a single-mode optical fiber (usual optical fiber, rather than a polarization preserving fiber) having a core diameter of 5 μm, a refractive index of 1.45, and a length of 340 m. The optical fiber ring 3 includes a first coupler optical fiber 4 having its one end connected to the left end surface 2a of the semiconductor laser 2, a second coupler optical fiber 5 having its one end connected to the right end surface 2b of the semiconductor laser 2, and a sensor coil 6 disposed to connect between the respective other ends of the first and second coupler optical fibers 4 and 5.

The first and second coupler optical fibers 4 and 5 guide the CW and CCW lights emitted from the end surfaces 2a and 2b of the semiconductor laser 2 into the optical fiber ring 3 and also introduce the CCW and CW lights propagating in the respective opposite directions into the semiconductor laser 2 respectively from the end surfaces 2a and 2b.

The sensor coil 6 includes a circular cylindrical bobbin 6a having a radius r and a coil winding 6b formed by winding an optical fiber around the bobbin 6a in a multilayer manner. In the present embodiment, the radius r of the bobbin 6a is 30 mm.

In the present embodiment, the optical splitter 7 is a two-input two-output optical directional coupler composed of two optical fibers melted and stretched to be combined together. The optical splitter 7 in the present embodiment is disposed in the optical path of the second coupler optical fiber 5 and is adapted to extract and separate part (10% in the present embodiment) of each of the CW and CCW lights propagating in the optical fiber ring 3 off the second coupler optical fiber 5. A detector optical fiber 8 configured into a loop and connected to an optical detection unit 9 is connected to a diverging side of the optical splitter 7 (that is input and output ports located at the outer side of the optical fiber ring 3), whereby two lights extracted and separated by the optical splitter 7 propagate in the respective opposite directions, reach the optical detection unit 9 and are overlapped on each other.

The optical detection unit 9 includes a photodiode (light receiving element) to convert an optical signal into an electrical signal and a detection circuit to process an output signal from the photodiode. The detection circuit detects a beat signal generated by overlapping the CW and CCW lights on each other, and an angular velocity is calculated based on a frequency of the beat signal.

Description will now be made of the operation and advantageous effects of the above described semiconductor ring laser gyroscope 1 with reference to the relevant drawings.

When a current supplied from a driving circuit (not shown) is applied to the semiconductor laser 2, the semiconductor laser 2 emits the CW and CCW lights from the end surfaces 2a and 2b thereof, respectively. The CW light emitted from the left end surface 2a propagates in the first coupler optical fiber 4, reaches the sensor coil 6, and circulates through the coil winding 6b. The CW light having circulated through the coil winding 6b propagates in the second coupler optical fiber 5 and is introduced into the semiconductor laser 2 from the right end surface 2b. Thus, the CW light emitted from the left end surface 2a of the semiconductor laser 2 is caused to circulate in the clockwise direction through the photoperiodic circuit (laser resonator) composed of the semiconductor 2 and the optical fiber ring 3, whereby laser resonance is generated.

On the other hand, the CCW light emitted from the right end surface 2b propagates in the second coupler optical fiber 5, reaches the sensor coil 6, and circulates through the coil winding 6b. The CW light having circulated through the coil winding 6b propagates in the first coupler optical fiber 4 and is introduced into the semiconductor laser 2 from the left end surface 2a. Thus, the CCW light emitted from the left end surface 2b of the semiconductor laser 2 is caused to circulate in the counter-clockwise direction through the photoperiodic circuit (laser resonator) composed of the semiconductor 2 and the optical fiber ring 3, whereby laser resonance is generated.

Then, the CW and CCW lights circulating through the optical fiber ring 3 are partly extracted and guided to the optical detection unit 9 via the optical splitter 7 and the detector optical fiber 8. At this stage, if the semiconductor ring laser gyroscope 1 is at a stationary state, then the frequency (wavelength) of the CW light is equal to the frequency of the CCW light, and therefore a beat signal is not generated. In this case, if spectrum analysis is applied to the output signal from the optical detection unit 9 using a spectrum analyzer, only a plurality of longitudinal modes (hereinafter referred to as ring resonator spectrum) corresponding to the laser resonator length (the sum of the optical length of the semiconductor laser 2 and the optical length of the optical fiber ring 3) are observed (refer to FIG. 2 to be discussed later). In the following description, the frequency of a first-order ring resonator spectrum will be referred to as ring resonance frequency $F_{rlg}$.

Since the semiconductor laser 2 has a shorter optical length than the optical fiber, the ring resonance frequency $F_{rlg}$ is represented in an approximate manner as follows:

$$F_{rlg} = C/nL$$

where C is a light speed, n is a refractive index of the optical fiber constituting the optical fiber ring 3, and L is an overall length of the optical fiber (the length of the optical fiber constituting the optical fiber ring 3). Also, in the present invention, since the lengths of the first and second coupler optical fibers 4 and 5 are by far shorter than the length ($=2\pi rN$) of an optical fiber to constitute the coil winding 6b of the sensor coil 6, the overall length L of the optical fiber is represented in an approximate manner as follows:

$$L = 2\pi rN$$

where N is a turn number of the optical fiber wound around the bobbin 6a of the sensor coil 6 in a multilayer manner.

Then, if the semiconductor ring laser gyroscope 1 is caused to move circularly, a difference occurs in frequency between the CW light and the CCW light due to the Sagnac effect, and a beat signal is generated by the CW light and the CCW light overlapped on each other. In this case, the beat signal (signal generated at the beat signal frequency (beat frequency $\Delta F_{beat}$)) and the sideband wave of each order ring resonator spectrum can be observed by the spectrum analyzer (refer to FIG. 3B to be discussed later). In this connection, the absolute value of a difference between the ring resonator spectrum frequency and the sideband wave frequency is equivalent to the beat frequency $\Delta F_{beat}$. An angular velocity $\Omega$ around the sensor coil 6 is calculated from the beat frequency $\Delta F_{beat}$ based on the following expression showing the relation between the angular velocity $\Omega$ and the beat frequency $\Delta F_{beat}$:

$$\Omega = (n\lambda L/4A)\Delta F_{beat}$$

where $\lambda$ is a wavelength of the CW and CCW lights (wavelength at a stationary state). Also, in the present invention, the aggregate total area A of regions enclosed by the optical fiber can be assumed approximately equal to $N\pi r^2$ which is obtained for the product of a radial cross-sectional area $\pi r^2$ of the sensor bobbin 6 (bobbin 6a) having a radius r and the turn number N of the optical fiber. Further, the overall length L of the optical fiber as path length can be assumed approximately equivalent to $2\pi rN$ as described above. Accordingly, the relation between the angular velocity $\Omega$ and the beat frequency $\Delta F_{beat}$ can be represented by the following expression:

$$\Omega = (n\lambda/2r)\Delta F_{beat}$$

The above expression indicates that the sensitivity for detecting the angular velocity Q depends on the radius r of the bobbin 6a of the sensor coil 6 and not on the overall length L of the optical fiber (nor on the turn number N of the optical fiber). The study of the present inventors, however, discovered that the reduction of the diameter of the bobbin 6a, while contributing to downsizing the device, resulted in totally disabling detection of the beat signal. Under the circumstance, the present inventors continued their study in order to clarify and address what occurred and it turned out that when the overall length L of the optical fiber was increased by winding an optical fiber around the bobbin 6a of the sensor coil 6 in a multilayer manner, the beat signal was effectively detected. And, it was found out that it is preferable to set the overall length L of the optical fiber within a predetermined range in view of the relation between the beat signal and the ring resonator spectrum. Description will now be made on the relation of the overall length L of the optical fiber to the beat signal and the ring resonator spectrum.

Figure 2:
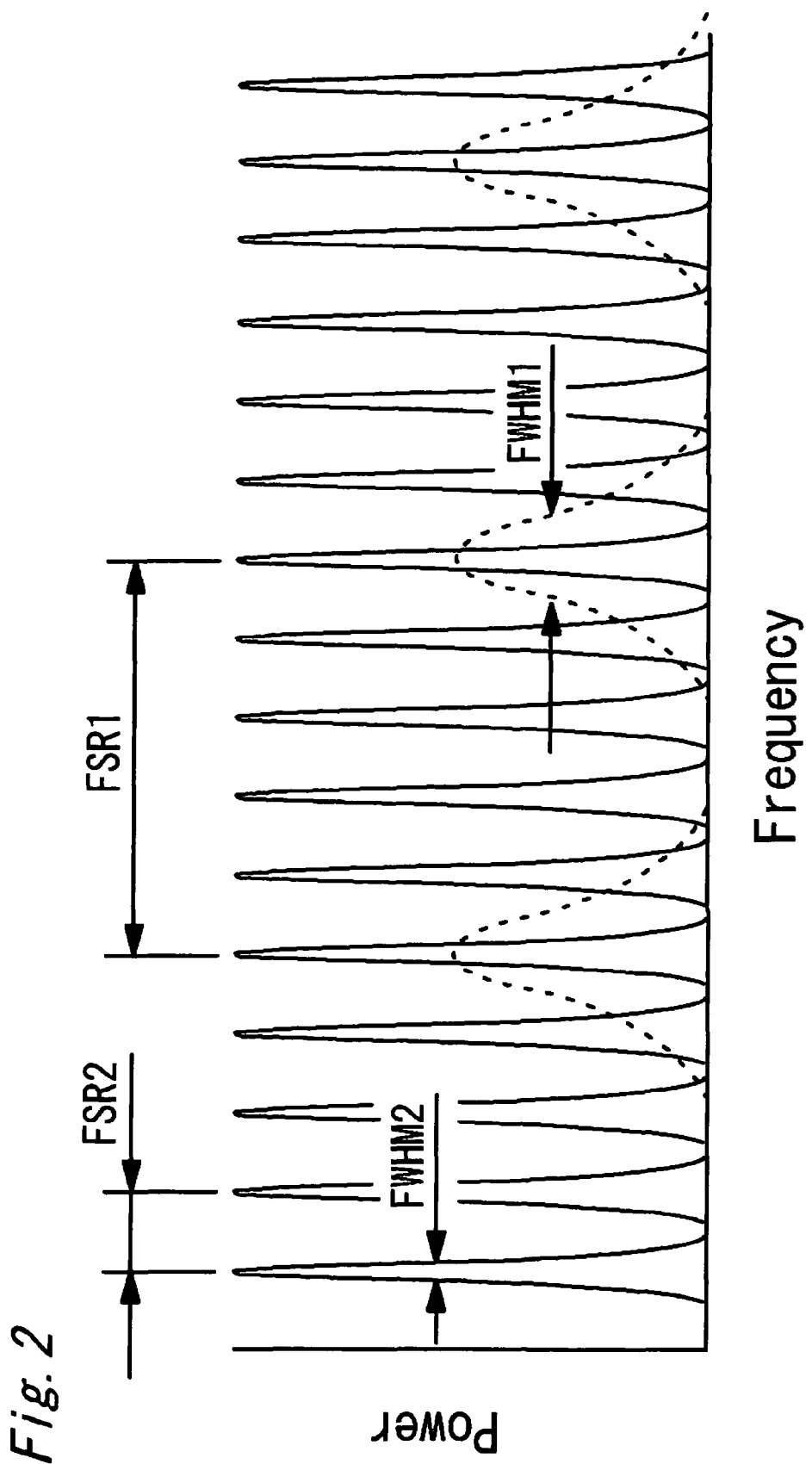
FIG. 2 is a schematic view of ring resonator spectra.
Figure 3A:
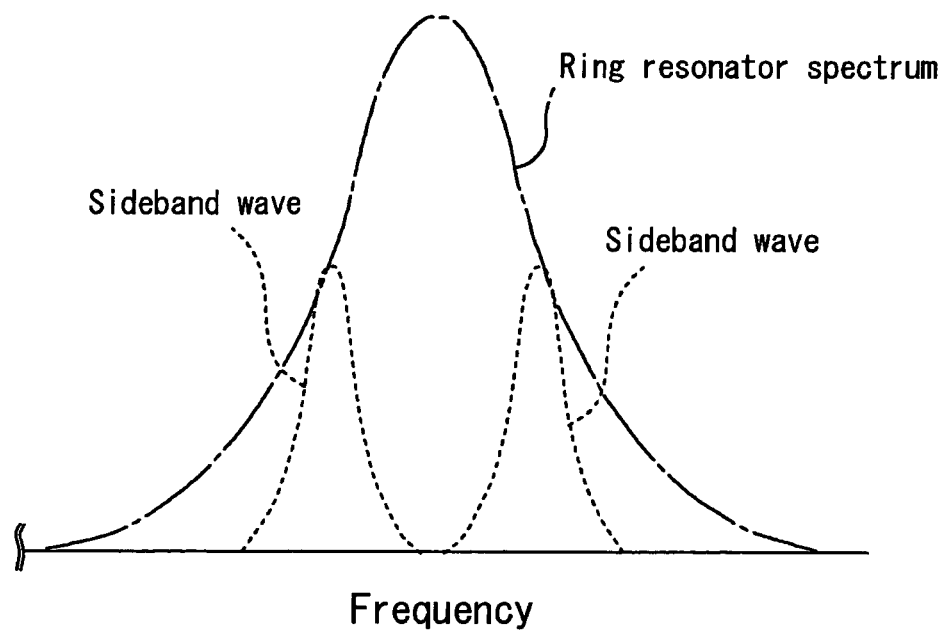
FIG. 3A is a schematic view of sideband waves hidden in a ring resonator spectrum when an overall length of an optical fiber is relatively short.

An FWHM (full width at half maximum) representing a spectral line width and an FSR (free spectral range: corresponding to the ring resonance frequency $F_{rlg}$ (=C/nL)) representing a pitch distance between adjacent two of a plurality of ring resonator spectra generated at regular intervals vary depending on the overall length L of the optical fiber as shown in FIG. 2. Specifically, when the overall length L of the optical fiber is relatively short (which is indicated by a broken line in the figure), the ring resonator spectra have a large FWHM (FWHM1) and also a large FSR (FSR1) (thus, a ring resonance frequency $F_{rlg}1$ is large). On the other hand, when the overall length L of the optical fiber is relatively long (which is indicated by a solid line in the figure), the ring resonator spectra have a small FWHM (FWHM2) and also a small FSR (FSR2) (thus, a ring resonance frequency $F_{rlg}2$ is small). The above phenomenon that the FWHM and the FSR vary depending on the overall length L of the optical fiber is caused by the fact that the optical fiber ring 3 and the semiconductor laser 2 in combination constitute the laser resonator, and is characteristic of a semiconductor ring laser gyroscope The beat signal is, as described above, observed (produced) also as the sideband wave of the ring resonator spectrum. When the ring resonator spectrum has a large FWHM, the sideband wave of the ring resonator spectrum is hidden (buried) in the spectrum skirt of the ring resonator spectrum as schematically shown in FIG. 3A, and the beat signal cannot be detected (a signal is not generated at the beat frequency). Under the above circumstance, in order to enable detection of a beat signal close to a lower limit of the beat frequency $\Delta F_{beat}$ (the lower limit is a beat frequency corresponding to a lower limit $\Omega_{min}$ of an angular velocity measuring range required of a gyroscope, and is hereinafter referred to as beat frequency lower limit $\Delta F_{beat\_min}$), it is effective to increase the overall length L of the optical fiber for the following reason. If the overall length L of the optical fiber is increased, then the FWHM of the ring resonator spectrum is narrowed, whereby the sideband wave hidden in the spectrum skirt of the ring resonator spectrum becomes evident (is exposed) thus enabling generation of a beat signal. Based on this viewpoint, a quantitative experimental investigation was made on the overall length L of the optical fiber, and it was known that if the overall length L of the optical fiber is increased such that the ring resonance frequency $F_{rlg}$ (=C/nL) is equal to or less than ten times the beat frequency lower limit $\Delta F_{beat\_min}$ (=$2\pi\Omega_{min}/n\lambda$), the beat signal can be precisely and reliably detected all the way down to the beat frequency lower limit $\Delta F_{beat\_min}$.

Figure 3B:
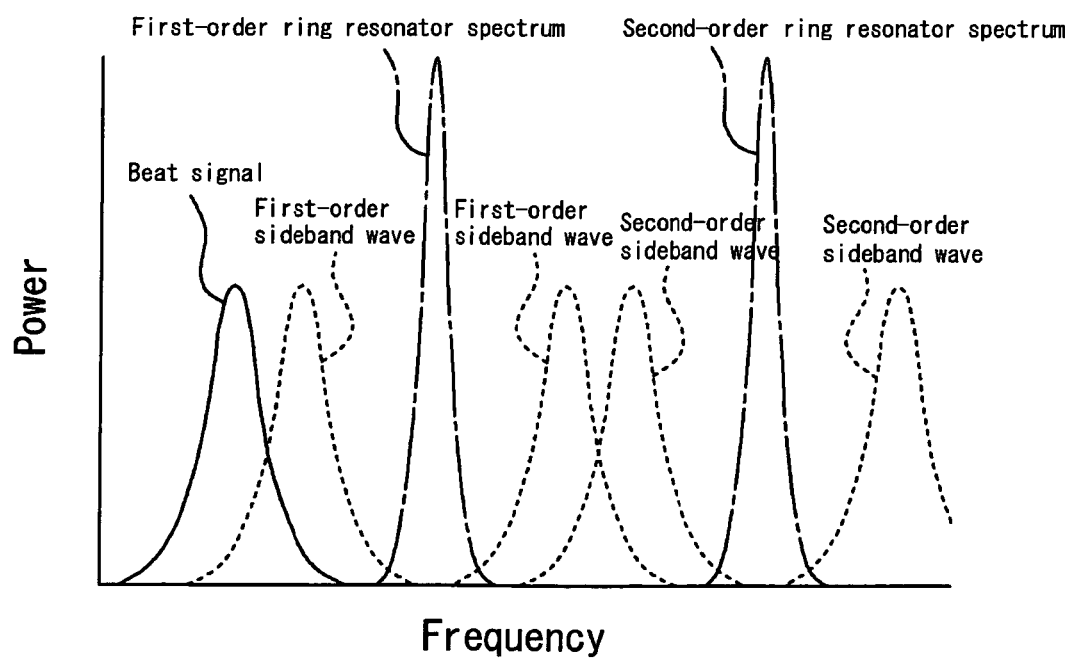
FIG. 3B is a schematic view of sideband waves of a ring resonator spectrum partly overlapped with a part of a beat signal when the overall length of the optical fiber is relatively long.

When the overall length L of the optical fiber was further increased to exceed a certain threshold, however, it occurred that the sensitivity for detecting a beat signal close to an upper limit of the beat frequency $\Delta F_{beat}$ (the upper limit is a beat frequency corresponding to an upper limit $\Omega_{max}$ of an angular velocity measuring range required of a gyroscope, and is hereinafter referred to as beat frequency upper limit $\Delta F_{beat\_max}$) was lowered or became unstable. So, a further investigation was made and it was revealed that the occurrence described above is attributable to a cause peculiar to a semiconductor ring laser gyroscope. Specifically when the overall length L of the optical fiber is increased, the FSR (or the ring resonance frequency $F_{rlg}$) is decreased as described above. Consequently, if the overall length L of the optical fiber ring is set equal to or larger than a predetermined length, the distance between the beat signal (signal generated at the beat frequency) and the sideband wave of the ring resonator spectrum is narrowed and the beat signal and the sideband wave of the ring resonator spectrum are overlapped with each other as shown in FIG. 3B. If they are overlapped to a large extent, then the beat frequency can hardly be detected accurately. Hence, it is considered that the reason the sensitivity for detecting a beat signal close to the beat frequency upper limit $\Delta F_{beat\_max}$ is lowered when the overall length L of the optical fiber is increased to exceed a threshold is because the beat signal and the sideband wave of the ring resonator spectrum are overlapped with each other.

Since the beat signal and the sideband wave of the ring resonator spectrum are completely overlapped with each other on the condition that the frequency of the sideband wave of the ring resonator spectrum is defined by: $F_{rlg} \cdot \Delta F_{beat}$, the following expression is established: $\Delta F_{beat} = F_{rlg} - \Delta F_{beat}$, that is to say $2\Delta F_{beat} = F_{rlg}$. As described above, the beat signal is observed also as the sideband wave of the ring resonator spectrum. A sideband wave is generated at each of both sides of the ring resonator spectrum, wherein the frequency decrease with an increase in beat frequency in the sideband wave at the lower frequency side. Therefore, as the beat frequency increases, the beat signal (signal generated at a beat frequency) and the sideband wave of the ring resonator spectrum get close to each other on the frequency axis. And, when an expression: $F_{rlg} - \Delta F_{beat\_max} = \Delta F_{beat\_max}$, that is $F_{rlg} = 2\Delta F_{beat\_max}$ is established, the beat signal and the sideband wave of the ring resonator spectrum are overlapped with each other and it becomes difficult or impossible to detect the frequency. Accordingly, if the ring resonator frequency $F_{rlg}$ (that is the overall length of the optical fiber) is determined to the beat frequency upper limit $\Delta F_{beat\_max}$ so as to satisfy the condition of $2\Delta F_{beat\_max} < F_{rlg}$, the beat signal can be precisely and reliably detected up to the beat frequency upper limit. Hence, it turns out that in order to inhibit the detection sensitivity degradation attributed to the beat signal overlapped with the sideband wave of the ring resonator spectrum, the overall length L of the optical fiber must be restricted so that the ring resonance frequency $F_{rlg}$ (=C/nL) exceeds two times the beat frequency upper limit; $\Delta F_{beat\_max}$ (=$2\pi\Omega_{max}/n\lambda$) thus representing ($2\Delta F_{beat\_max} < F_{rlg}$). In this connection, considering the beat signal as well as the FWHM of the ring resonator spectrum, the overall length L of the optical fiber is preferably determined so that the ring resonance frequency $F_{rlg}$ (=C/nL) is equal to or larger than about 2.5 or more times the beat frequency upper limit $\Delta F_{beat\_max}$ thus representing ($2.5\Delta F_{beat\_max} \leq F_{rlg}$).

In accordance with the result of the study, in the semiconductor ring laser gyroscope 1, the overall length L of the optical fiber is so determined that the beat frequency $\Delta F_{beat}$ (the beat frequency lower limit $\Delta F_{beat\_min}$ and upper limit $\Delta F_{beat\_max}$) and the ring resonance frequency $F_{rlg}$ satisfy a relational expression: $2\Delta F_{beat\_max} < F_{rlg} \leq 10\Delta F_{beat\_min}$ (preferably, $2.5\Delta F_{beat\_max} \leq F_{rlg} \leq 10\Delta F_{beat\_min}$), whereby the semiconductor ring laser gyroscope 1, while small sized with a small diameter, is enabled to successfully detect the beat signal all the way from the beat frequency lower limit $\Delta F_{beat\_min}$ up to the beat frequency upper limit $\Delta F_{beat\_max}$. That is to say, the semiconductor ring laser gyroscope 1 is capable of precisely and reliably detecting an angular velocity throughout the entire measuring range. Also; by using the above relational expression, the overall length L of the optical fiber can be optimally determined quickly with respect to a certain measuring range for a beat frequency (the beat frequency lower limit $\Delta F_{beat\_min}$ and upper limit $\Delta F_{beat\_max}$), and therefore it is expected that the semiconductor ring laser gyroscope 1 is easily produced (in which case, it is required for the beat frequency lower limit $\Delta F_{beat\_min}$ and upper limit $\Delta F_{beat\_max}$ to satisfy a given relation).

On the other hand, if the overall length L of the optical fiber is previously fixed at a certain value, then the beat frequency lower limit $\Delta F_{beat\_min}$ and upper limit $\Delta F_{beat\_max}$ are so determined as to satisfy the relational expression: $2\Delta F_{beat\_max} < F_{rlg} \leq 10\Delta F_{beat\_min}$ (preferably, $2.5\Delta F_{beat\_max} \leq F_{rlg} \leq 10\Delta F_{beat\_min}$), whereby the semiconductor ring laser gyroscope 1 can be provided which is capable of successfully detecting a beat frequency and eventually an angular velocity throughout the entire measuring range. Also, by using the above relational expression, the maximum measuring range for a beat frequency with respect to the overall length L of the optical fiber can be quickly determined, and therefore it is expected that the semiconductor ring laser gyroscope is easily produced.

Figure 4:
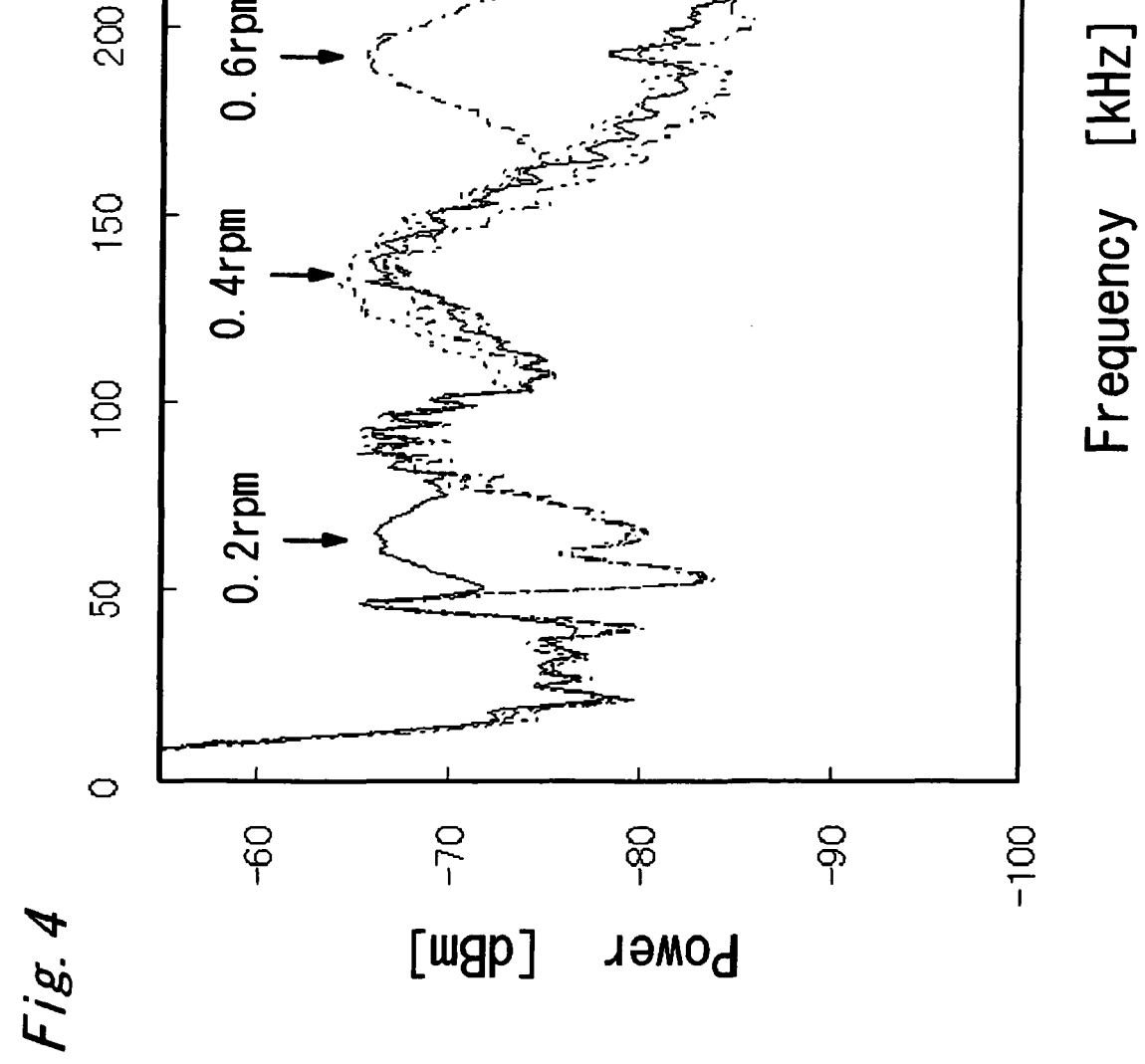
FIG. 4 is a chart of measurement results of a relation between an angular velocity (revolution) and a beat frequency.
Figure 5:
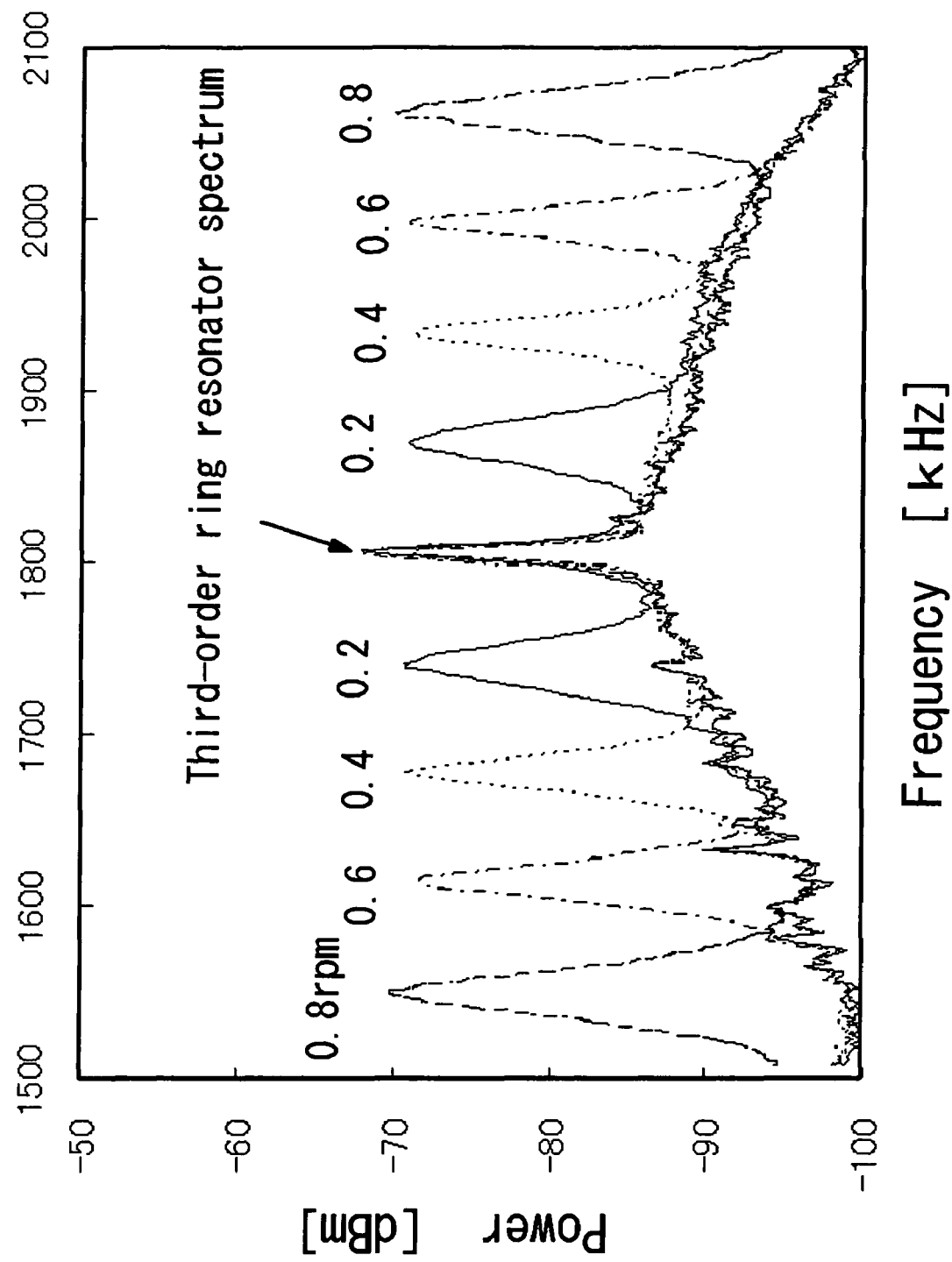
FIG. 5 is a chart of measurement results of a relation between an angular velocity (revolution) and a sideband wave frequency.

In order to verify the above advantageous effects, the evaluation results for the performance of the semiconductor ring laser gyroscope 1 experimentally produced are shown in FIGS. 4 and 5 which show the measurement results of the beat signal and the sideband wave, respectively. In FIG. 5, the sideband wave of a three-dimensional ring resonator spectrum is shown as an example of the sideband wave, wherein the difference between the three-dimensional ring resonator spectrum frequency and the sideband wave frequency corresponds to the beat frequency $\Delta F_{beat}$. It is verified as shown in FIGS. 4 and 5 that the beat frequency $\Delta F_{beat}$ can be precisely detected from 60 kHz up to 250 kHz (which corresponds to an angular velocity of 0.2 rpm to 0.8 rpm). Also, since the ring resonator frequency $F_{rlg}$ is about 600 kHz, the relational expression: $2\Delta F_{beat\_max} < F_{rlg} \leq 10\Delta F_{beat\_min}$ is satisfied. In the above evaluation, the radius r of the sensor coil is 30 mm, but it was verified the angular velocity can be well detected also in the case when the radius r is 100 mm, 200 mm, 300 mm or 400 mm.

The semiconductor ring laser gyroscope 1 according to the first embodiment of the present invention can be reduced in size and therefore can be structured as a multi-axial gyroscope in which multiple photoperiodic circuits are provided thereby detecting angular velocities about multiple axes. Also, if the sensor coil 6 is activated by using a gonio stage or the like, an angular velocity in an arbitrary direction can be detected only by one sensor coil.

Figure 6A:
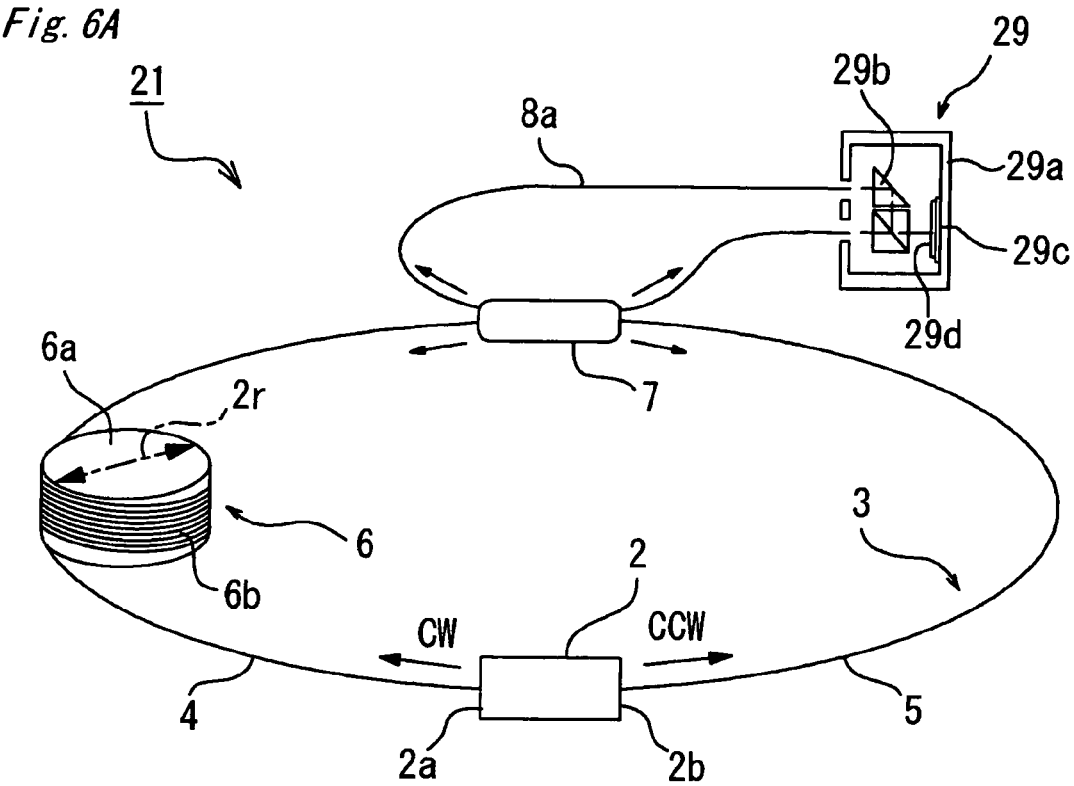
FIG. 6A is a schematic view of a semiconductor ring laser gyroscope according to a second embodiment of the present invention.
Figure 6B:
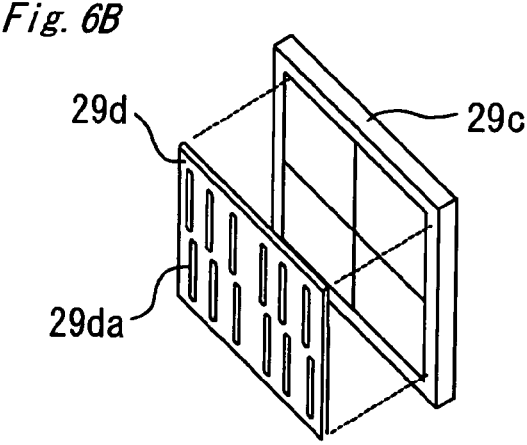
FIG. 6B is a schematic view of an optical detection unit shown in FIG. 6A.

A second embodiment of the present invention will be described with reference to FIGS. 6A to 6C. FIG. 6A schematically shows a semiconductor ring laser gyroscope 21 according to the second embodiment. Since the semiconductor ring laser gyroscope 21 differs mainly in an optical detection unit 29 from the semiconductor ring laser gyroscope 1 according to the first embodiment, description will be focused on the optical detection unit 29 and components identical to or corresponding to those of the semiconductor 1 will be omitted below.

The optical detection unit 29 includes a case 29*a* having two openings, a multiplexing prism 29*b* disposed at the center of the case 29*a*, a sectioned (four-sectioned in the present embodiment) photodiode (light receiving element) 29*c* including a plurality (four in the present embodiment) of light receiving faces and disposed at the output side of the multiplexing prism 29*b*, and a mask 29*d* disposed to cover the light receiving faces of the four-sectioned photodiode 29*c*. Referring to FIG. 6B, the mask 29*d* includes three (at least one) slits 29*da* for each of the light receiving faces of the four-sectioned photodiode 29*c*. The slits 29*da* extend in the same direction as interference stripes (to be described later) extend. Also, the slits 29*da* are shifted by a predetermined phase (one fourth wavelength of a cycle of the interference stripes in the present embodiment) from one light receiving face to another. The distance between adjacent two of the three slits 29*da* is set equal to the distance between adjacent two interference stripes at every light receiving face.

Both ends of a detector optical fiber 8*a* which guides parts of CW and CCW lights split by an optical splitter 7 into the optical detection unit 29 are disposed at the two openings of the case 29*a*, respectively. The CW and CCW lights emitted respectively from the both ends of the detector optical fiber 8*a* are multiplexed by the multiplexing prism 29*b*. The multiplexed light goes through the slits 29*da* formed on the mask 29*d* and falls incident on each of the light receiving faces of the four-sectioned photodiode 29*c*.

Figure 6C:
FIG. 6C is a view of interference stripes.
Figure 7:
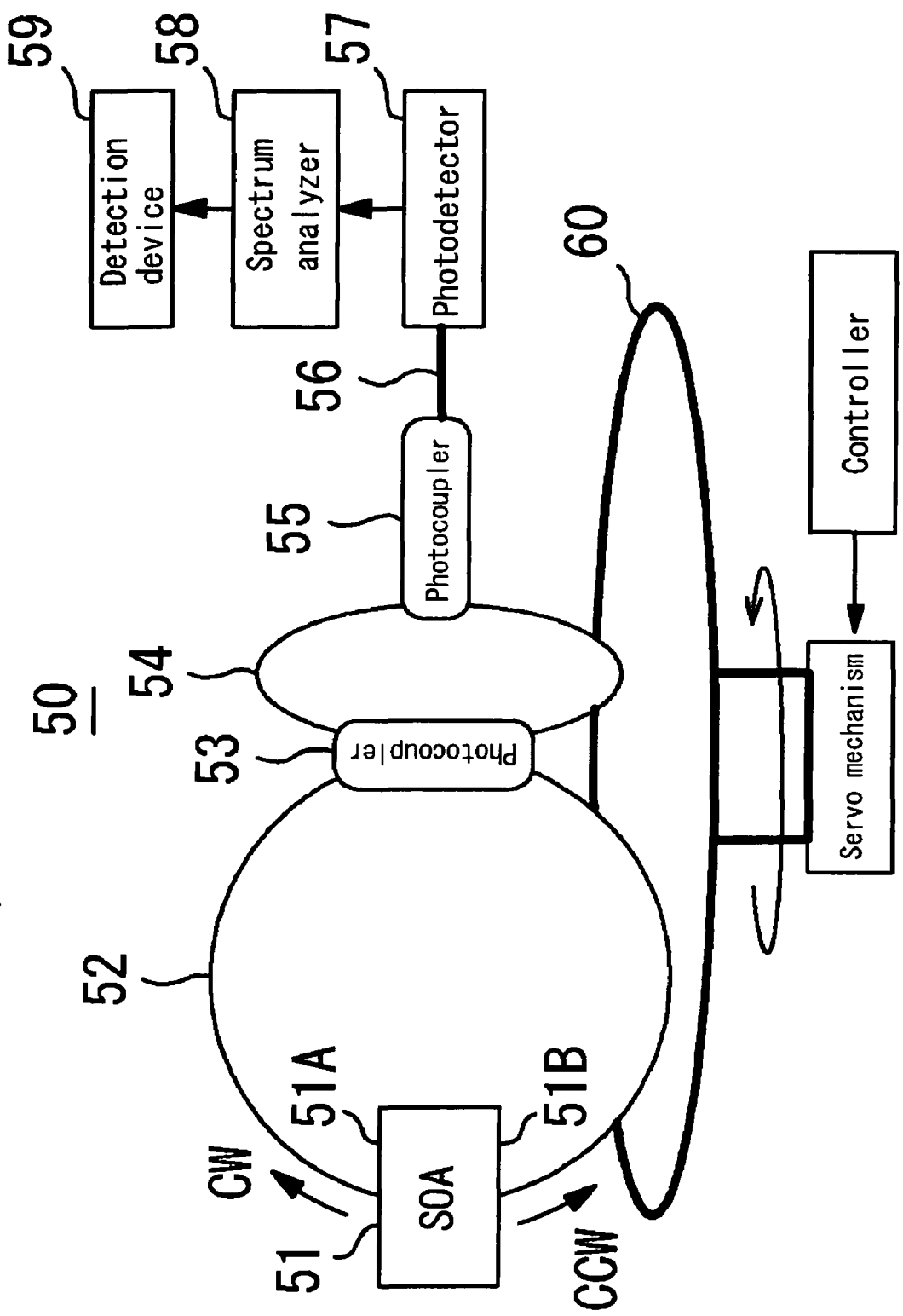
FIG. 7 is a schematic view of a conventional optical gyroscope.

When the semiconductor ring laser gyroscope 21 remains stationary, the frequencies of the CW and CCW lights agree to each other, and therefore stationary interference strips as shown in FIG. 6C are formed. When the semiconductor ring laser gyroscope 21 is rotated, a difference is generated between the frequencies of the CW and CCW lights due to the Sagnac effect, and the interference stripes pass through the slits 29*ds* and are caused to move over each of the light receiving faces of the four-sectioned photodiode 29. The speed and the direction of the movement of the interference stripes depend on the beat frequency and the rotation direction, respectively. Consequently, the beat frequency and the movement direction are obtained by detecting the speed and direction of the movement of the interference stripes by using the mask 29*d* having the slits 29*da* shifted from one light receiving face to another as well as the four-sectioned photodiode 29*c*. And the angular velocity and the rotation direction can be determined by the beat frequency and the movement direction.

Thus, the semiconductor ring laser gyroscope 21 according to the second embodiment, while similarly achieving the advantageous effects achieved by the semiconductor ring laser gyroscope 1 according to the first embodiment, is adapted to be capable of measuring an angular velocity and also determining a rotation direction with a simple structure. In this connection, the speed and the direction of the movement of the interference stripes which are detected by using the four-sectioned photodiode 29*c* in the embodiment described above can be detected by using at least two light receiving faces or light receiving elements. Also, if the light receiving faces or the light receiving elements are arranged at a predetermined interval, the speed and the direction of movement the interference stripes can be detected without providing the mask 29*d*.

While the present invention has been described with respect to specific embodiments, it is to be understood that the present invention is by no means limited thereto but encompasses various changes and modifications.

For example, the optical fiber to constitute the optical fiber ring 3 is not necessarily a single-mode optical fiber but may alternatively be a multi-mode optical fiber. Also, the bobbin 6*a* of the sensor coil 6 does not have to have a circular cylindrical shape but may have, for example, a cylindrical shape with a cross section of an ellipse or a polygon. Further, the bobbin 6*a* may not be used, and alternatively the sensor coil 6 may be formed by winding an optical fiber around an air core in a multilayer manner.

What is claimed is:

1. A semiconductor ring laser gyroscope comprising:
   a semiconductor laser for emitting two lights from both end surfaces thereof;
   an optical fiber ring through which the two lights emitted from the both end surfaces of the semiconductor laser propagate in respective opposite directions, and which, in association with the semiconductor laser, constitutes a laser resonator;
   an optical detection unit for detecting a rotational angular velocity based on beat frequencies of the two lights propagating through the optical fiber ring in the respective opposite directions; and
   a sensor coil made of an optical fiber wound in a multilayer manner, the sensor coil constituting a part of the optical fiber ring;
   wherein the optical fiber ring is structured to satisfy an expression (1):

$$F_{rlg} \leq 10\Delta F_{beat\_min} \quad (1)$$

in which $F_{rlg}=C/nL$, where $F_{rlg}$ is a ring resonance frequency, $\Delta F_{beat\_min}$ is a beat frequency corresponding to a lower limit of an angular velocity measuring range of the optical detection unit, C is a light speed, n is a refractive index of the optical fiber, and L is an overall length of the optical fiber.

2. A semiconductor ring laser gyroscope according to claim 1, wherein the optical fiber ring is structured to satisfy an expression (3):

$$2\Delta F_{beat\_max} < F_{rlg} \leq 10\Delta F_{beat\_min} \qquad (3)$$

in which $F_{rlg}=C/nL$, where $\Delta F_{beat\_max}$ is a beat frequency corresponding to an upper limit of an angular velocity measuring range, $F_{rlg}$ is a ring resonance frequency, $\Delta F_{beat\_min}$ is a beat frequency corresponding to a lower limit of the angular velocity measuring range, C is a light speed, n is a refractive index of the optical fiber, and L is an overall length of the optical fiber.

3. A semiconductor ring laser gyroscope according to claim 1,
wherein the optical detection unit comprises: an optical splitter for extracting part of each of the two lights propagating through the optical fiber ring in the respective opposite directions; a multiplexing prism for causing the two lights extracted by the optical splitter to interfere with each other; a sectioned photodiode comprising a plurality of light receiving faces for receiving an interfered light produced by the multiplexing prism; and a mask disposed between the multiplexing prism and the sectioned photodiode and comprising a plurality of slits having their respective phases shifted from one light receiving face to another.

4. A semiconductor ring laser gyroscope according to claim 1, wherein the semiconductor laser is a Fabry-Perot semiconductor laser.

5. A semiconductor ring laser gyroscope according to claim 3, wherein the semiconductor laser is a Fabry-Perot semiconductor laser.

6. A semiconductor ring laser gyroscope comprising:
a semiconductor laser for emitting two lights from both end surfaces thereof;
an optical fiber ring through which the two lights emitted from the both end surfaces of the semiconductor laser propagate in respective opposite directions, and which, in association with the semiconductor laser, constitutes a laser resonator;
an optical detection unit for detecting a rotational angular velocity based on beat frequencies of the two lights propagating through the optical fiber ring in the respective opposite directions; and a sensor coil made of an optical fiber wound in a multilayer manner, the sensor coil constituting a part optical fiber ring;
wherein the optical fiber ring is structured to satisfy an expression (2):

$$2\Delta F_{beat\_max} < F_{rlg} \qquad (2)$$

in which $F_{rlg}=C/nL$, where $\Delta F_{beat\_max}$ is a beat frequency corresponding to an upper limit of an angular velocity measuring range of the optical detection unit, $F_{rlg}$ is a ring resonance frequency, C is a light speed, n is a refractive index of the optical fiber, and L is an overall length of the optical fiber.

7. A semiconductor ring laser gyroscope according to claim 6, wherein the semiconductor laser is a Fabry-Perot semiconductor laser.

8. A semiconductor ring laser gyroscope comprising:
a semiconductor laser for emitting two lights from both end surfaces thereof;
an optical fiber ring through which the two lights emitted from the both end surfaces of the semiconductor laser propagate in respective opposite directions, and which, in association with the semiconductor laser, constitutes a laser resonator;
an optical detection unit for detecting a rotational angular velocity based on beat frequencies of the two lights propagating through the optical fiber ring in the respective opposite directions; and a sensor coil made of an optical fiber wound in a multilayer manner, the sensor coil constituting a part of the optical fiber ring;
wherein the optical detection unit comprises: an optical splitter for extracting part of each of the two lights propagating through the optical fiber ring in the respective opposite directions; a multiplexing prism for causing the two lights extracted by the optical splitter to interfere with each other; a sectioned photodiode comprising a plurality of light receiving faces for receiving an interfered light produced by the multiplexing prism; and a mask disposed between the multiplexing prism and the sectioned photodiode and comprising a plurality of slits having their respective phases shifted from one light receiving face to another.

9. A semiconductor ring laser gyroscope according to claim 8, wherein the semiconductor laser is a Fabry-Perot semiconductor laser.

* * * * *